Dec. 17, 1957     J. A. BUVELOT     2,816,802
AXLE ASSEMBLY
Filed May 6, 1953
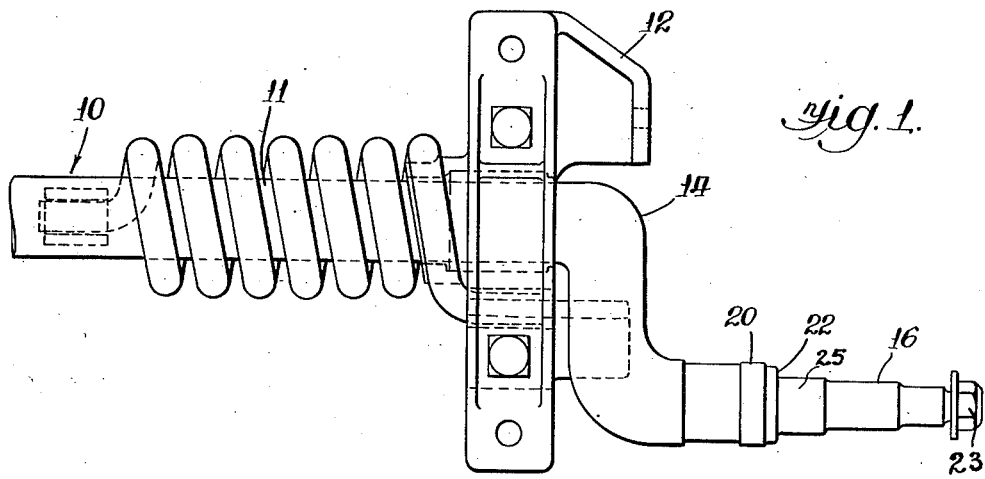
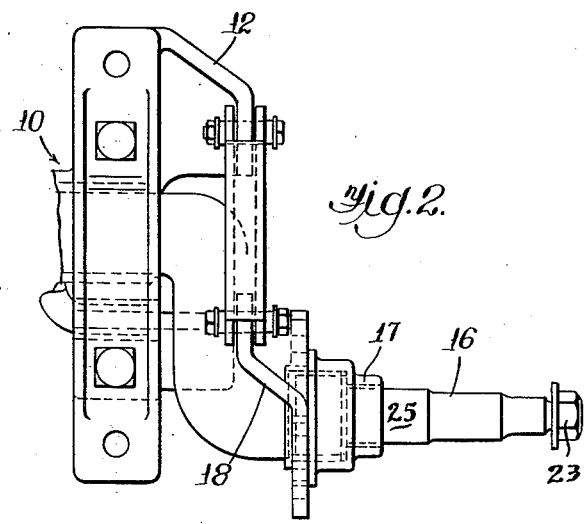
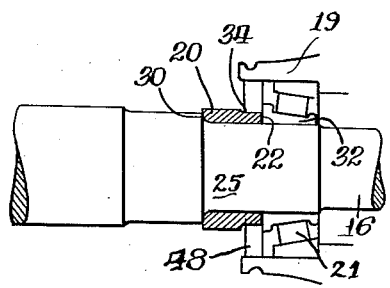
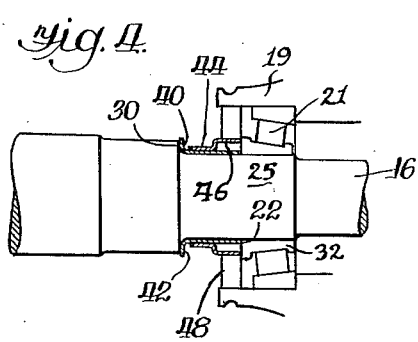
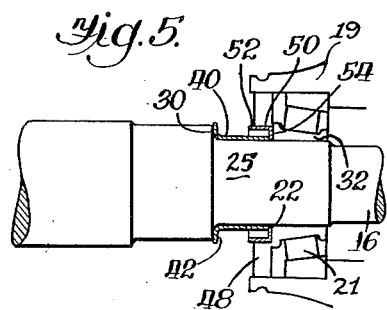
INVENTOR.
John A. Buvelot

United States Patent Office 2,816,802
Patented Dec. 17, 1957

2,816,802

AXLE ASSEMBLY

John A. Buvelot, Chicago, Ill., assignor to American Steel Foundries, Chicago, Ill., a corporation of New Jersey Application May 6, 1953, Serial No. 353,356

3 Claims. (Cl. 301—131)

My invention relates to axle assemblies of the trailing axle type and more particularly to a novel arrangement permitting the ready adaptation of a movable brake flange to said assembly.

For a better understanding of the herein disclosed invention, attention is directed to my copending application, Serial No. 348,043, filed April 10, 1953, now Patent Number 2,730,206. In said copending application the function and operation of the trailing type axle assembly is clearly set out and the incorporation with said assembly of a movable brake flange normally utilized with axle assemblies of this type is clearly described.

The trailing wheel type axle assembly is normally used to support any vehicle body, such as a trailer. In current applications to properly support the vehicle body multiple axle assemblies are utilized, that is, several axle assemblies in tandem arrangement are attached to the vehicle body. It is the current habit of trailer manufacturers to apply brake mechanisms to one axle assembly of the tandem arrangement, this usually being sufficient to properly control vehicle operation. Accordingly, present designed axle assemblies have different physical dimensions depending upon whether they are to be used with or without the movable brake flange referred to above. It will be readily understood that once the vehicle is in service it may become desirable to apply braking arrangements to all of the axle assemblies on the truck. Heretofore such a change of operation would require the disassembly of axles not equipped with movable brake flanges and the discarding of same and substituting therefor a new axle properly designed to be equipped with the movable brake flange.

Accordingly, it is the general object of my invention to provide a novel axle assembly of the type described which permits the ready incorporation of a movable brake flange.

It is a further object of my invention to provide a trailing type axle which is designed for the incorporation of a movable brake flange with a readily removable bushing which will enable the axle to be used without said flange upon the addition of the bushing.

It is a still further object of my invention to provide several types of removable bushings to satisfy the functional requirement hereinabove set out.

Other objects of the invention will become apparent in the course of the following description and drawings, wherein:

Figure 1 is a fragmentary plan view of a novel trailing type axle showing the bushing in position;

Figure 2 is a fragmentary plan view of said axle assembly with the bushing removed and a movable brake flange mounted thereon;

Figure 3 is a fragmentary view showing a form of my novel bushing in position on the axle and illustrating in phantom lines the pertinent portion of the attached wheel assembly;

Figure 4 is a view similar to Figure 3 but illustrating a slightly modified form of the incorporated bushing, and Figure 5 is another view similar to Figure 3 and illustrating another modified form of the incorporated bushing.

Describing the invention in detail, an axle assembly generally designated 10 is utilized to support a related vehicle body by being disposed transversely of the body and secured to the underside thereof. The assembly 10 comprises a main shaft 11 journaled within the bearing block 12 and having a throw or crank arm 14 connected thereto outboardly of the block 12. Another shaft or spindle 16 is formed to parallel the main shaft 22 and is eccentrically carried thereby on the end of a crank arm 14 and spaced from the axis of the main shaft 11. The spindle 16 is formed to rotatably mount the conventional cup, cone, bearings and associated wheel.

Directing attention to Figure 2, it will be seen that the spindle may rotatably mount a brake flange 18, said flange being carried by the spindle when the hereinbefore mentioned bushing is removed. The flange 18 is pivotally link connected to the bearing block 12, the structure and function of which is clearly set out in the hereinbefore referred to copending application.

Referring again to Figure 1, it will be seen that in the position normally occupied by a portion 17 of the rotatably mounted brake flange 18 on the cylindrical bearing section 25 of the spindle 16, I have positioned a spacer or bushing 20. The bushing 20 providing at its outboard end a mounting shoulder 22, which normally is offered by the outboard end of the brake flange 18 when said flange is incorporated with the assembly.

Referring to Figure 3, it will be seen that the bushing 20 is positioned on the spindle 16 to tightly abut a shoulder 30 formed on said spindle at the inboard end of the bearing section 25. An inner race 32 of the wheel mounting bearings 21 is placed on the bearing section of the spindle outboardly of the bushing 20 and in such position as to tightly abut the shoulder 22 offered by said bushing 20 and to clamp the latter against the shoulder 30. It will be readily seen that the inner race 32 forms part of the cup, cone, bearing assembly which offers rotatable mounting for the vehicle supporting wheel 19. It should also be noted that the bushing 20 provides a finished cylindrical surface 34, of smaller diameter than the outer diameter of the inner race 32 over which may be sleeved a grease seal 48 which, in turn, retains lubricating material in the area of the mentioned bearing assembly. The brake flange and/or the bushing, the bearing assembly, and the wheel may be retained on the spindle in any desired manner as by a nut 23 threadably engaged with the outboard end of the spindle.

Referring to Figure 4, it will be seen that I have provided a bushing arrangement of a different character than that provided in Figure 3. In this embodiment the bushing comprises a formed cylinder or bushing 40 of relatively thin section having a lip or flange 42 on one end thereof which abuts the shoulder 30 of the spindle 16. Again the inner bearing race 32 is positioned on the spindle outboardly of the bushing 40 in such position that it abuts the shoulder 22 presented by the bushing 40. A cylindrical grease seal supporting member 44 is sleeved over the bushing 40 and press fitted or otherwise secured to the outer diameter thereof. Said member 44 is provided with an upstanding flange 46 which offers cylindrical surface mounting for the grease seal 48.

In the embodiment of Figure 5, a bushing 40, identical in form with the bushing 40 of the embodiment of Figure 4, is provided. However, a grease seal mounting member 50 of different form is incorporated with this structure. Here the grease seal mounting member is generally cylindrical but in cross section is seen to comprise angularly arranged flanges 52 and 54. The flange 54 is positioned to abut the inner face of the inner bearing race 32 and is disposed intermediate said face and the shoulder 22 presented by the bushing 40. It will thus be seen that the inner race 32 tightly presses the grease seal mounting member 50 against the shoulder 22 which in turn presses the bushing 40 against the shoulder 30 of the spindle 16. Thus it will be seen that the member 50 is held nonrotatably on the spindle 16 without the necessity of press fitting said member to the periphery of the bushing 40, as was done in the embodiment of Figure 4.

Accordingly, with an axle assembly as I have provided, it is no longer necessary to have different axle designs for use with or without a movable brake flange. The axle can be standardized to the one normally adapted to the mounting of a movable brake flange, and when it becomes desirable to furnish an axle assembly without the brake flange attached thereto it is only necessary to provide said axle with a bushing of the type herein disclosed. If in the course of operational service it becomes desirable to add braking mechanisms to the supported vehicle it is only necessary to disassemble the wheels from the axle assembly, remove the readily demountable bushing and substitute therefor the movable brake flange hereinbefore shown and described. Thus it will be seen that I have provided an axle assembly readily adaptable to use with and without a mounted brake flange with its consequent savings from a production standpoint and its consequent advantages from the standpoint of utility.

I claim:

1. In a wheel and axle assembly arrangement adapted to be provided with a brake flange, a bearing bracket for attachment to a vehicle body, a main shaft journaled therein, spring means yieldably resisting rotation of said shaft relative to said bracket, a crank arm on said shaft, a spindle on said arm parallel to said shaft and presenting a bearing section having an inboard shoulder, an anti-friction bearing having an inner race sleeved over said section and axially spaced outboardly from said shoulder a predetermined distance, a wheel rotatably mounted on said bearing, means to secure said bearing on said spindle, a brake flange having a hub portion of the same axial dimension as said predetermined distance and adapted for mounting on the bearing section in snug interposition between said shoulder and said bearing, and a readily removable bushing of the same axial dimension as said predetermined distance adapted for mounting on said bearing section in snug interposition between said shoulder and said bearing in place of said brake flange hub portion to maintain said predetermined axial distance between said shoulder and said bearing when the brake flange is not used.

2. A wheel and axle assembly arrangement according to claim 1 and including concentric cylindrical inner and outer surfaces presented by the wheel and bushing, respectively, and an annular grease retaining seal positioned inboardly adjacent said bearing and interposed between said surfaces in engagement therewith.

3. A wheel and axle assembly according to claim 1 and including an annular grease retaining seal mounting member snugly fitted over the outboard end of said bushing, a pair of concentric cylindrical inner and outer surfaces presented by the wheel and member, respectively, and an annular grease retaining seal positioned inboardly adjacent said bearing and interposed between said surfaces in engagement therewith.

References Cited in the file of this patent

UNITED STATES PATENTS

| 725,787 | Smith | Apr. 21, 1903 |
| 2,041,457 | Cautley | May 19, 1936 |
| 2,426,513 | Linn | Aug. 26, 1947 |

FOREIGN PATENTS

| 447,076 | Great Britain | May 12, 1936 |